US012587099B2

(12) United States Patent
Bertolini et al.

(10) Patent No.: US 12,587,099 B2
(45) Date of Patent: Mar. 24, 2026

(54) COIL SHORT CIRCUIT PROTECTION IN DC-DC CONVERTERS

(71) Applicant: STMicroelectronics International N.V., Geneva (CH)

(72) Inventors: Alessandro Bertolini, Vermiglio (IT); Alessandro Gasparini, Cusano Milanino (IT)

(73) Assignee: STMicroelectronics International N.V., Geneva (CH)

( * ) Notice: Subject to any disclaimer, the term of this patent is extended or adjusted under 35 U.S.C. 154(b) by 109 days.

(21) Appl. No.: 18/594,776

(22) Filed: Mar. 4, 2024

(65) Prior Publication Data

US 2025/0279643 A1 Sep. 4, 2025

(51) Int. Cl.
| | |
|---|---|
| *H02M 3/158* | (2006.01) |
| *H02H 7/12* | (2006.01) |
| *H02M 1/00* | (2006.01) |
| *H02M 1/32* | (2007.01) |
| *H02M 1/36* | (2007.01) |

(52) U.S. Cl.
CPC ........ *H02M 3/1588* (2013.01); *H02H 7/1213* (2013.01); *H02M 1/0009* (2021.05); *H02M 1/32* (2013.01); *H02M 1/36* (2013.01); *H02M 3/1582* (2013.01)

(58) Field of Classification Search
CPC ........ H02M 1/0009; H02M 1/32; H02M 1/36; H02M 3/158; H02M 3/1582; H02M 3/1588; H02H 7/1213
See application file for complete search history.

(56) References Cited

U.S. PATENT DOCUMENTS

| | | |
|---|---|---|
| 10,644,598 B1 | 5/2020 | Lewinski Komincz et al. |
| 2015/0236590 A1* | 8/2015 | Yonezawa ............... H02M 1/08 |
| | | 323/271 |
| 2015/0241891 A1 | 8/2015 | Lee |

(Continued)

FOREIGN PATENT DOCUMENTS

| | | |
|---|---|---|
| CN | 113991992 A | 1/2022 |

*Primary Examiner* — Gary L Laxton
(74) *Attorney, Agent, or Firm* — Crowe & Dunlevy LLC

(57) ABSTRACT

Circuitry for detecting a short across an inductor of a DC-DC converter includes a decoupling-circuit coupled between an inductor-terminal and an intermediate-node that, when activated, generates a detection-voltage (representative of voltage at the inductor-terminal) at the intermediate-node. A logic-circuit has an input coupled to the intermediate-node and an output generating a detection-signal. The detection-signal is asserted when the detection-voltage is closer to an input-voltage to the DC-DC converter than ground but is deasserted when the detection-voltage is closer to ground. Control-circuitry, at the beginning of a high-side conduction-phase, activates the decoupling-circuit and delays for a delay-period. After expiration of the delay-period and in response to the detection-signal being asserted, the control-circuitry completes the high-side conduction-phase. After expiration of the delay period and when the detection-signal is deasserted, the control-circuitry ceases the high-side conduction-phase of the DC-DC converter without completing the high-side conduction-phase and prevent beginning of a low-side conduction-phase.

15 Claims, 1 Drawing Sheet

(56)     References Cited

U.S. PATENT DOCUMENTS

| 2016/0373002 | A1 |   | 12/2016 | Borfigat et al. | |
| 2021/0336529 | A1 |   | 10/2021 | Zhou et al. | |
| 2023/0198403 | A1 |   | 6/2023 | Cho | |
| 2023/0396164 | A1 | * | 12/2023 | Kruiskamp | H02M 3/158 |
| 2024/0128854 | A1 | * | 4/2024 | D'Souza | H02M 1/08 |
| 2025/0233498 | A1 | * | 7/2025 | Hayakawa | H02M 1/0054 |

\* cited by examiner

COIL SHORT CIRCUIT PROTECTION IN DC-DC CONVERTERS

TECHNICAL FIELD

This disclosure relates to the field of power electronics and, more particularly, to the detecting of short circuits in inverting buck-boost DC-DC converters used in electronic devices.

BACKGROUND

The utilization of DC-DC converters, particularly inverting buck-boost converters, is commonplace in modern electronic devices. These converters provide for efficient power management, enabling the conversion of an input DC voltage to an output DC voltage which is either higher or lower than the input. However, an issue that may arise in the operation of these DC-DC converters is the presence of a short circuit across the inductor. Such short circuits may pose significant risks to the overall functionality and safety of the electronic device.

When a short circuit occurs across the inductor, it can lead to a variety of detrimental outcomes. One of the primary concerns is the potential damage to the integrated circuit that forms the core of the DC-DC converter. This damage can compromise the efficiency and reliability of the converter, leading to a cascading effect on the device's performance. Additionally, such short circuits can have severe implications for the battery of the device. The sudden and uncontrolled flow of current can cause excessive heat generation, leading to battery degradation or, in extreme cases, battery failure. This not only shortens the lifespan of the battery but also raises safety concerns, as overheating batteries can be a fire hazard.

Moreover, the occurrence of a short circuit in the inductor can result in the overheating of the device itself. Excessive heat generation is a threat to the electronic components within the device, potentially leading to their malfunction or permanent damage.

Given these risks, the ability to detect shorting of the inductor in a DC-DC converter is highly desired. Indeed, it would be desired for effective detection mechanisms to be in place not only at the start-up of the device but also during regular operation, to provide for continuous monitoring and the possibility of immediate response in the event of a short circuit. It would also be desired for the detection to occur on a cycle-by-cycle basis. Once a short circuit is detected, the operation of the DC-DC converter could then be halted immediately, preventing further damage to the device.

In view of this, further development into techniques for detecting a short circuit across the inductor of a DC-DC converter is necessary.

SUMMARY

Disclosed herein is an inductor short detection circuit for detecting a short across an inductor of a DC-DC converter. The inductor short detection circuit includes: a decoupling circuit coupled between a terminal of the inductor and an intermediate node, wherein the decoupling circuit is configured to, when activated, generate a detection voltage at the intermediate node, the detection voltage being representative of a voltage at the terminal of the inductor; a logic circuit having an input coupled to the intermediate node and an output at which a detection signal is produced, the detection signal being asserted by the logic circuit in response to the detection voltage being closer to an input voltage to the DC-DC converter than to ground but being deasserted by the logic circuit in response to the detection voltage being closer to ground than to the input voltage to the DC-DC converter; and control circuitry. The control circuitry is configured to, in response to beginning of a high-side conduction phase of the DC-DC converter: activate the decoupling circuit; delay for a delay period; after expiration of the delay period and in response to the detection signal being asserted, complete the high-side conduction phase of the DC-DC converter; and after expiration of the delay period and in response to the detection signal being deasserted, cease the high-side conduction phase of the DC-DC converter without completing the high-side conduction phase and prevent beginning of a low-side conduction phase of the DC-DC converter.

The decoupling circuit may include a decoupling transistor connected between the terminal of the inductor and the intermediate node, the decoupling transistor configured to be turned on in response to the beginning of a high-side conduction phase of the DC-DC converter.

The logic circuit may include an inverter having an input coupled to the intermediate node and an output at which the detection signal is produced. The inverter may be powered between the input voltage to the DC-DC converter and a clamp voltage. The logic circuit may also include an additional inverter having an input connected to the intermediate node and an output connected to the input of the inverter, and this additional inverter may be powered between the input voltage to the DC-DC converter and the clamp voltage.

The decoupling circuit may include a decoupling transistor connected between the terminal of the inductor and the intermediate node, and a control inverter may be configured to turn on the decoupling transistor in response to assertion of a high-side control signal for a high-side transistor of the DC-DC converter. The control inverter may be powered between the input voltage to the DC-DC converter and the clamp voltage.

The inductor short detection circuit may include a clamp voltage generation circuit which is formed by: a first transistor having a first conduction terminal coupled to the input voltage to the DC-DC converter through a first diode, a second conduction terminal connected to a current sink and to a control terminal of the first transistor; and a second transistor having a first conduction terminal coupled to the input voltage to the DC-DC converter through a first resistor, a second conduction terminal coupled to ground, and a control terminal coupled to the control terminal and second conduction terminal of the first transistor; wherein the clamp voltage is formed at a tap between the first conduction terminal of the second transistor and the first resistor.

A counter circuit may be configured to be used by the control circuitry to delay for the delay period. The counter circuit may include: a timing capacitor connected between a timing node and ground; a current source configured to source a charging current to the timing node; a reset transistor configured to turn off to permit charging of the timing capacitor by the charging current in response to beginning of the high-side conduction phase of the DC-DC converter; and a comparator configured to indicate expiration of the delay period in response to a voltage at the timing node becoming at least equal to a reference voltage.

Method aspects are also disclosed herein. Included is a method for detecting a short circuit across an inductor of a DC-DC converter, the method including: in response to beginning a high-side conduction phase of the DC-DC converter, generating a detection voltage representative of a voltage at a terminal of the inductor; delaying for a delay period; asserting a detection signal based upon the detection voltage being closer to an input voltage to the DC-DC converter than to ground, but deasserting the detection signal based upon the detection voltage being close to ground than to the input voltage to the DC-DC converter; after expiration of the delay period and in response to the detection signal being asserted, completing the high-side conduction phase of the DC-DC converter; and after expiration of the delay period and in response to the detection signal being deasserted, ceasing the high-side conduction phase of the DC-DC converter without completing the high-side conduction phase and preventing beginning of a low-side conduction phase of the DC-DC converter.

The method may further include: in response to beginning the high-side conduction phase, activating a decoupling circuit connected between the terminal of the inductor and an intermediate node to generate the detection voltage at the intermediate node; and upon expiration of the given delay period, sensing the detection voltage using a logic circuit that asserts or deasserts the detection signal based thereupon.

Sensing the detection voltage using the logic circuit may be performed by: powering an inverter between the input voltage to the DC-DC converter and a clamp voltage; and sensing the detection voltage using the inverter, which has its input coupled to the detection voltage.

Delaying for a given delay period may be performed by charging a timing capacitor until a voltage across the timing capacitor becomes equal to a reference voltage.

DETAILED DESCRIPTION

Figures 1, 2, 3:
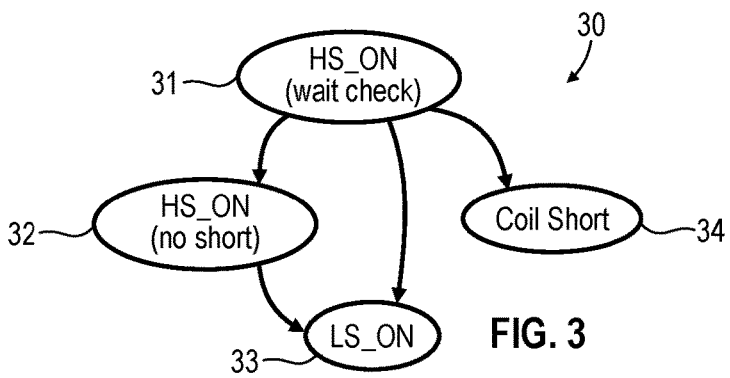
FIG. 1 is a schematic block diagram of an inductor short detection circuit for detecting a short across an inductor of a Buck-Boost DC-DC converter, as disclosed herein.
FIG. 2 is a schematic block diagram of an example implementation of a counter utilized in the timing of the read by the inductor short detection circuit of FIG. 1.
FIG. 3 is a state diagram of the control circuitry of FIG. 1 when implemented as a state machine.

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

The inductor short detection circuit disclosed herein and described hereinbelow is predicated on the understanding of the electrical behavior of a voltage source depending on whether it is connected to a resistor or an inductor. Specifically, the voltage across a resistor, when connected to a voltage source, adheres to Ohm's Law, V=I·R, where V is the voltage, I is the current, and R is the resistance of the resistor. In cases with multiple resistors, the voltage division principle applies, according to Ohm's Law and Kirchhoff's Voltage Law.

In contrast, the behavior of an inductor connected to a voltage source is different. The voltage across an inductor is determined by the equation $$V = L \cdot \frac{dI}{dT},$$

where L represents the inductance, and dI/dT is the rate of change of current with respect to time. This relationship indicates that in a steady state, where the current through the inductor is constant, the voltage across the inductor will be zero due to the lack of current change.

Based on this principle, the inductor short detection circuit described hereinbelow operates by measuring the voltage across an inductor after a time delay. Under normal operating conditions where a short across the inductor is not present, the voltage at the switching node of the converter utilizing the inductor would move close to the supply voltage as would be expected. However, in the event of a short circuit across the inductor, the voltage at the switching node would not be close to the supply voltage after the time delay, indicating the presence of the short circuit.

With this in mind, a Buck-Boost DC-DC converter 5 and the inductor short detection circuit 10 for detecting a short across an inductor L of the Buck-Boost DC-DC converter 5 is now described with reference to FIG. 1.

The Buck-Boost DC-DC converter 5 includes: the inductor L connected between switching node NLX and reference node $N_N$; an output capacitor $C_{OUT}$ connected between node $N_N$ and output node $N_{OUT}$; an extended drain low-side power n-channel MOS transistor (NMOS) MN2 having its drain connected to node NLX, its source connected to node $N_{OUT}$, and its gate coupled to receive a low-side control signal LS_ON after downward level shifting of that signal by level-shifter 42; and an extended drain high-side power NMOS transistor MN1 having its drain coupled to receive input voltage $V_{IN}$, its source connected to node NLX, and its gate coupled to receive a high-side control signal HS_ON after upward level shifting of that signal by level-shifter 41. The load 14 is connected between node $N_N$ and node $N_{OUT}$. Observe here that node $N_N$ is connected to ground.

The inductor short detection circuit 10 includes: an extended drain p-channel MOS transistor (PMOS) MP1 having its drain connected to node NLX, its source connected to node N1, and its gate connected to receive the output of inverter 13, the transistor MP1 serving to decouple the rest of the inductor short detection circuit 10 from the high-voltage DC-DC converter; a resistor R1 connected between nodes N1 and N2; an inverter 11 having its input connected to node N1; and an inverter 12 having its input connected to receive the output of inverter 11, the inverter 12 generating a detection signal $V_{LX}$ at its output, with level shifter 44 shifting this signal downward for reading by the control circuitry 19. The inverters 11 and 12 are powered between the input voltage $V_{IN}$ and a clamping voltage $P_{CLAMP}$ received at node N2. The inverter 13 receives the high-side control signal HS_ON after upward level shifting of that signal by level shifter 43 at its input and, as stated, has its output connected to control the gate of p-channel transistor MP1. The inverter 13 is powered between the input voltage $V_{IN}$ and the clamping voltage $P_{CLAMP}$.

The clamping voltage $P_{CLAMP}$ is generated by the clamp voltage generation circuit 20, which is formed by: extended drain p-channel MOS transistor MP2 having its source coupled to the input voltage $V_{IN}$ through Zener diode $D_{S1}$, its drain connected to current sink 16, and its gate connected to its drain; and extended drain p-channel MOS transistor MP3 having its source coupled to the input voltage $V_{IN}$ through resistor R2, its drain connected to ground, and its gate connected to the gate and drain of p-channel transistor MP2. The clamping voltage $P_{CLAMP}$ is formed at the source of p-channel transistor MP3.

Control circuitry 19, which may include a state machine, receives the output $V_{LX}$ of the inverter 12 (which is a signal indicative of a detection by the circuit 10 of an inductor short), the output voltage $V_{OUT}$, and an end count signal $END_{COUNT}$ as input, and generates the high-side control signal HS_ON and low-side control signal LS_ON in response thereto and based thereupon.

Operation of the Buck-Boost DC-DC converter 5 can be divided into two phases controlled by the operation of the high-side MN1 and low-side MN2 transistors. Assuming there is no short across the inductor L, when the high-side transistor MN1 is turned on through assertion of the high-side control signal HS_ON by the control circuitry 19, the input voltage $V_{IN}$ charges the inductor L, storing energy in its magnetic field. During this phase, the low-side transistor MN2 is kept off through deassertion of the low-side control signal LS_ON by the control circuitry 19, isolating the load 14 from the inductor L. In the second phase, also assuming no short across the inductor L, the high-side transistor MN1 is turned off through deassertion of the high-side control signal HS_ON by the control circuitry 19, and the low-side transistor MN2 is turned on through assertion of the low-side control signal LS_ON by the control circuitry 19, allowing the inductor L to discharge its stored energy to the load 14 and the output capacitor $C_{OUT}$. This inverts the polarity of the output voltage $V_{OUT}$ produced at node $N_{OUT}$ (across the output capacitor $C_{OUT}$) relative to the input voltage $V_{IN}$, with the magnitude of the output voltage $V_{OUT}$ being controlled by the duty cycle of the transistors MN1 and MN2.

The specific timing and duty cycle of the high-side control signal HS_ON and low-side control signal LS_ON, as well as the overall operating regime of the Buck-Boost DC-DC converter 5, is controlled by the control circuitry 19, but will not be discussed in further detail, as such operation is well-understood by those skilled in the art and this disclosure focused on the detection of shorts across the inductor L.

To that end, recall now the above discussion about the difference between the voltage across an inductor as opposed to the difference between the voltage across a resistor, when connected to a voltage source. Recall that the voltage across the inductor L would be zero at steady state in the absence of a short—this implies that the voltage at node NLX would be expected to be close to the input voltage $V_{IN}$ (approximately $V_{IN}$ less the voltage drop across transistor MN1) after transistor MN1 has been on for a sufficiently long period of time if there is no short across the inductor L. However, if there is a short across the inductor L, given that node $N_N$ is coupled to ground, the voltage at node NLX would instead be expected to be close to ground.

Therefore, at the assertion of the high-side control signal HS_ON, a delay counter 20 (shown in FIG. 2) is activated by the control circuitry 19 to produce a delay, and the transistor MP1 is turned on to permit sensing of the voltage at node NLX by the inductor short detection circuit 10.

The counter 20 may, in one example embodiment, be formed by a timing capacitor $C_T$ connected between node N3 and ground, with a current source 22 supplying a charging current I to node N3. A reset n-channel transistor MN3 has its drain connected to node N3, its source connected to ground, and its gate coupled to receive the output of inverter 21. A comparator 23 has its non-inverting input terminal connected to node N3 and its inverting input terminal connected to a reference voltage $V_{REF}$. Inverter 21 receives a counter start signal $START_{COUNT}$ at its input, with this counter start signal $START_{COUNT}$ being asserted when the high-side control signal HS_ON is asserted and deasserted when the high-side control signal HS_ON is deasserted. Therefore, prior to assertion of the high-side control signal HS_ON, the counter start signal $START_{COUNT}$ is deasserted, with the output of the inverter 21 therefore turning on the reset transistor MN3 to discharge the timing capacitor $C_T$ so that it is fully discharged when the high-side control signal HS_ON is asserted. Consequently, when the high-side control signal HS_ON is turned on, the counter start signal $START_{COUNT}$ is asserted so that the reset transistor MN3 is turned off to permit charging of the timing capacitor $C_T$ to begin the count. When the voltage across the timing capacitor $C_T$ becomes equal to the reference voltage $V_{REF}$, the comparator 23 asserts an output flag $END_{COUNT}$ at its output to indicate that the designated delay time has elapsed, with the value of the reference voltage $V_{REF}$, the capacitance of the timing capacitor $C_T$, and the magnitude of the charging current I produced by the current source 22 setting the designated delay time.

If the voltage at node NLX is close to the input voltage $V_{IN}$ at the assertion of the output flag $END_{COUNT}$ (e.g., closer to the input voltage than ground), the voltage $V_{LX}$ at the output of the inverter 12 will be asserted no later than at the assertion of the output flag $END_{COUNT}$, indicating to the control circuitry 19 that there is not a short across the inductor L. On the other hand, if the voltage at node NLX is at ground (e.g., closer to ground than to the input voltage) at the assertion of the of the output flag $END_{COUNT}$, the voltage $V_{LX}$ at the output of the inverter 12 will be deasserted no later than at the assertion of the output flag $END_{COUNT}$, indicating to the control circuitry 19 that there is a short across the inductor L.

The control circuitry 19 may contain or be implemented as a state machine operating as shown in the state diagram 30 of FIG. 3. In an initial state 31, the high-side control signal HS_ON is asserted (and the low-side control signal LS_ON is deasserted) by the control circuitry 19, the counter 20 is activated, and the voltage $V_{LX}$ at the output of the inverter 12 is read at the assertion of the output flag $END_{COUNT}$.

If the voltage $V_{LX}$ is near the input voltage $V_{IN}$, indicating a lack of short, operation proceeds to state 32 in which the control circuitry 19 continues to operate the high-side control signal HS_ON as per its usual operation, and when the high-side conduction period is completed, operation then proceeds to state 33 in which the control circuitry 19 asserts the low-side control signal LS_ON (and deasserts the high-side control signal HS_ON). At the end of state 33, operation reverts to state 31.

If, however, the voltage $V_{LX}$ is near ground when the voltage $V_{LX}$ at the output of the inverter 12 is read at the assertion of the output flag $END_{COUNT}$ during state 31, which is indicative of a short across the inductor L, then the control circuitry 19 instead proceeds to state 34. In this state, the control circuitry 19 immediately deasserts the high-side control signal HS_ON to cease conduction, and ends normal operation.

As can be seen from the state diagram 30, the checking for the presence of a short across the inductor L is performed on a cycle to basis at the beginning of each charging phase. Moreover, this detection of a short (if present) occurs regardless of variations in the Buck-Boost DC-DC converter 5 due to process, voltage, and temperature, regardless of operating condition, regardless of external component variations. In addition, this detection of a short is inherently fast and accomplished with simple circuitry that does not utilize an additional voltage supply rail. Thus, the desires mentioned above in the Background have been met.

It is evident that modifications and variations can be made to what has been described and illustrated herein without departing from the scope of this disclosure. For example, any suitable counter may be used in place of the counter 20. For example, a digital counter may be employed as the counter 20 to produce the desired delay period, an inverter chain (receiving the high-side control signal HS_ON as input) may be employed instead of the counter 20 to produce the desired delay period, etc. As another example of modifications and variations that may be made, the any Buck, Boost, or non-inverting Buck-Boost DC-DC converter may be utilized instead of the illustrated Buck-Boost DC-DC converter 5.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. An inductor short detection circuit for detecting a short across an inductor of a DC-DC converter, comprising:
a decoupling circuit coupled between a terminal of the inductor and an intermediate node, wherein the decoupling circuit is configured to, when activated, generate a detection voltage at the intermediate node, the detection voltage being representative of a voltage at the terminal of the inductor;
a logic circuit having an input coupled to the intermediate node and an output at which a detection signal is produced, the detection signal being asserted by the logic circuit in response to the detection voltage being closer to an input voltage to the DC-DC converter than to ground but being deasserted by the logic circuit in response to the detection voltage being closer to ground than to the input voltage to the DC-DC converter; and
control circuitry configured to, in response to beginning of a high-side conduction phase of the DC-DC converter:
activate the decoupling circuit;
delay for a delay period;
after expiration of the delay period and in response to the detection signal being asserted, complete the high-side conduction phase of the DC-DC converter; and
after expiration of the delay period and in response to the detection signal being deasserted, cease the high-side conduction phase of the DC-DC converter without completing the high-side conduction phase and prevent beginning of a low-side conduction phase of the DC-DC converter.

2. The inductor short detection circuit of claim 1, wherein the decoupling circuit comprises a decoupling transistor connected between the terminal of the inductor and the intermediate node, wherein the decoupling transistor is configured to be turned on in response to the beginning of a high-side conduction phase of the DC-DC converter.

3. The inductor short detection circuit of claim 1, wherein the logic circuit comprises an inverter having an input coupled to the intermediate node and an output at which the detection signal is produced.

4. The inductor short detection circuit of claim 3, wherein the inverter is powered between the input voltage to the DC-DC converter and a clamp voltage.

5. The inductor short detection circuit of claim 4, wherein the logic circuit comprises an additional inverter having an input connected to the intermediate node and an output connected to the input of the inverter.

6. The inductor short detection circuit of claim 5, wherein the additional inverter is powered between the input voltage to the DC-DC converter and the clamp voltage.

7. The inductor short detection circuit of claim 6,
wherein the decoupling circuit comprises a decoupling transistor connected between the terminal of the inductor and the intermediate node; and
further comprising a control inverter configured to turn on the decoupling transistor in response to assertion of a high-side control signal for a high-side transistor of the DC-DC converter.

8. The inductor short detection circuit of claim 7, wherein the control inverter is powered between the input voltage to the DC-DC converter and the clamp voltage.

9. The inductor short detection circuit of claim 8, further comprising a clamp voltage generation circuit, the clamp voltage generation circuit comprising:
a first transistor having a first conduction terminal coupled to the input voltage to the DC-DC converter through a first diode, a second conduction terminal connected to a current sink and to a control terminal of the first transistor; and
a second transistor having a first conduction terminal coupled to the input voltage to the DC-DC converter through a first resistor, a second conduction terminal coupled to ground, and a control terminal coupled to the control terminal and second conduction terminal of the first transistor;
wherein the clamp voltage is formed at a tap between the first conduction terminal of the second transistor and the first resistor.

10. The inductor short detection circuit of claim 1, further comprising a counter circuit configured to be used by the control circuitry to delay for the delay period.

11. The inductor short detection circuit of claim 10, wherein the counter circuit comprises:
a timing capacitor connected between a timing node and ground;
a current source configured to source a charging current to the timing node;
a reset transistor configured to turn off to permit charging of the timing capacitor by the charging current in response to beginning of the high-side conduction phase of the DC-DC converter; and
a comparator configured to indicate expiration of the delay period in response to a voltage at the timing node becoming at least equal to a reference voltage.

12. A method for detecting a short circuit across an inductor of a DC-DC converter, the method comprising:

in response to beginning of a high-side conduction phase
of the DC-DC converter, generating a detection voltage
representative of a voltage at a terminal of the inductor;
delaying for a delay period;
asserting a detection signal based upon the detection
voltage being closer to an input voltage to the DC-DC
converter than to ground, but deasserting the detection
signal based upon the detection voltage being close to
ground than to the input voltage to the DC-DC con-
verter;
after expiration of the delay period and in response to the
detection signal being asserted, completing the high-
side conduction phase of the DC-DC converter; and
after expiration of the delay period and in response to the
detection signal being deasserted, ceasing the high-side
conduction phase of the DC-DC converter without
completing the high-side conduction phase and pre-
venting beginning of a low-side conduction phase of
the DC-DC converter.

10

13. The method of claim 12, further comprising:
in response to beginning the high-side conduction phase,
activating a decoupling circuit connected between the
terminal of the inductor and an intermediate node to
generate the detection voltage at the intermediate node;
and
upon expiration of the delay period, sensing the detection
voltage using a logic circuit that asserts or deasserts the
detection signal based thereupon.
14. The method of claim 13, wherein sensing the detection
voltage using the logic circuit comprises:
powering an inverter between the input voltage to the
DC-DC converter and a clamp voltage; and
sensing the detection voltage using the inverter, which has
its input coupled to the detection voltage.
15. The method of claim 12, wherein delaying for a given
delay period is performed by charging a timing capacitor
until a voltage across the timing capacitor becomes equal to
a reference voltage.

* * * * *